(12) United States Patent
Ikebe

(10) Patent No.: US 9,205,561 B2
(45) Date of Patent: Dec. 8, 2015

(54) FORCE DETECTOR AND ROBOT

(71) Applicant: Seiko Epson Corporation, Tokyo (JP)

(72) Inventor: Tomo Ikebe, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/189,122

(22) Filed: Feb. 25, 2014

(65) Prior Publication Data

US 2014/0238174 A1  Aug. 28, 2014

(30) Foreign Application Priority Data

Feb. 26, 2013  (JP) ................ 2013-035503

(51) Int. Cl.
| | |
|---|---|
| G01L 1/22 | (2006.01) |
| B25J 9/16 | (2006.01) |
| G01L 5/00 | (2006.01) |
| G01L 5/22 | (2006.01) |
| G01L 1/16 | (2006.01) |
| G01L 1/14 | (2006.01) |
| G01L 1/20 | (2006.01) |
| G01L 5/16 | (2006.01) |
| G01L 1/18 | (2006.01) |

(52) U.S. Cl.
CPC ............... *B25J 9/1694* (2013.01); *G01L 5/009* (2013.01); *G01L 1/148* (2013.01); *G01L 1/16* (2013.01); *G01L 1/18* (2013.01); *G01L 1/20* (2013.01); *G01L 1/205* (2013.01); *G01L 1/22* (2013.01); *G01L 5/161* (2013.01); *G01L 5/162* (2013.01); *G01L 5/167* (2013.01); *G01L 5/226* (2013.01); *Y10S 901/09* (2013.01); *Y10T 74/20305* (2015.01)

(58) Field of Classification Search
CPC ............... G01L 1/16; G01L 1/18; G01L 1/20; G01L 1/22; G01L 1/148; G01L 1/205; G01L 5/161; G01L 5/167; G01L 5/226
USPC ...................... 73/862.621, 862.041–862.046, 73/862.636, 862.638, 862.625–862.629, 73/862.632–862.633
See application file for complete search history.

(56) References Cited

U.S. PATENT DOCUMENTS

| | | | | |
|---|---|---|---|---|
| 3,149,488 | A * | 9/1964 | Castro .......................... | 73/862.68 |
| 6,809,529 | B2 * | 10/2004 | Okada et al. .................. | 324/681 |
| 7,064,561 | B2 * | 6/2006 | Morimoto ...................... | 324/691 |
| 7,710,126 | B2 * | 5/2010 | Morimoto ...................... | 324/661 |

(Continued)

FOREIGN PATENT DOCUMENTS

| | | |
|---|---|---|
| JP | 60-135834 | 7/1985 |
| JP | 05-081977 | 4/1993 |

(Continued)

*Primary Examiner* — Lisa Caputo
*Assistant Examiner* — Jonathan Dunlap
(74) *Attorney, Agent, or Firm* — Harness, Dickey & Pierce, P.L.C.

(57) ABSTRACT

A force detector includes a plate-like first member, a plate-like second member provided with a gap between the first member and itself, an elastic member provided between the first member and the second member, and a plurality of pressure-sensitive devices provided between the elastic member and the second member, wherein an area of a surface of the elastic member at the first member side is larger than an area of a surface of the elastic member at the second member side. Further, the first member and the second member respectively have plate-like shapes. Furthermore, three or more of the elastic members are provided.

11 Claims, 6 Drawing Sheets

(56) References Cited

U.S. PATENT DOCUMENTS

| | | | |
|---|---|---|---|
| 2004/0056669 A1* | 3/2004 | Morimoto | 324/691 |
| 2004/0187602 A1 | 9/2004 | Okada | |
| 2008/0184819 A1* | 8/2008 | Morimoto | 73/862.626 |
| 2012/0048027 A1* | 3/2012 | Hashiguchi et al. | 73/763 |
| 2012/0098767 A1* | 4/2012 | Takai et al. | 345/173 |
| 2012/0198945 A1 | 8/2012 | Yoneyama | |
| 2013/0042702 A1* | 2/2013 | Huang et al. | 73/862.625 |

FOREIGN PATENT DOCUMENTS

| | | |
|---|---|---|
| JP | 2001-116635 A | 4/2001 |
| JP | 2008-164557 A | 7/2008 |
| JP | 2009-257992 A | 11/2009 |
| JP | 2010-151847 A | 7/2010 |
| JP | 2012-026907 A | 2/2012 |
| JP | 2012-132816 A | 7/2012 |
| JP | 2012-163333 A | 8/2012 |

* cited by examiner

FORCE DETECTOR AND ROBOT

BACKGROUND

1. Technical Field

The present invention relates to a force detector and a robot.

2. Related Art

Recently, introduction of industrial robots to production facilities including factories has been promoted for improvement in production efficiency. The industrial robot has an arm drivable with respect to a direction along a single axis or directions along multiple axes, a hand attached to the arm distal end, and an end effector including a part testing tool or a part carrying tool, and may execute part assembly work, part manufacturing work including part processing work, part carrying work, part testing work, etc.

In the industrial robot, for example, a force detector is provided between the arm and the end effector. As the force detector used for the industrial robot, for example, a force detector as disclosed in Patent Document 1 (JP-A-2008-164557) is used. The force detector described in Patent Document 1 includes a substrate, many pressure-sensitive devices provided on the substrate and arranged in a matrix, and a plurality of contacts provided on the pressure-sensitive devices and having parts of an elastic material in semispherical shapes. The respective contacts are provided on the many pressure-sensitive devices. Further, the area of the contact in cross section is larger at the pressure-sensitive device side (downside) than that at the opposite side to the pressure-sensitive device (upside). According to the configuration, the force detector described in Patent Document 1 may detect an applied external force.

However, in the force detector described in Patent Document 1, since the area of the contact in cross section is larger at the pressure-sensitive device side than that at the opposite side to the pressure-sensitive device, it is impossible to concentrate the applied external force on the pressure-sensitive device and poor sensitivity is problematic.

SUMMARY

An advantage of some aspects of the invention is to provide a force detector that may improve detection sensitivity in detection of external force and a robot using the force detector.

The advantage is achieved by the following aspects of the invention.

A force detector according to an aspect of the invention includes a plate-like first member, a plate-like second member provided with a gap between the first member and itself, an elastic member provided between the first member and the second member, and a plurality of pressure-sensitive devices provided between the elastic member and the second member, wherein an area of a surface of the elastic member at the first member side is larger than an area of a surface of the elastic member at the second member side.

In the aspect of the invention, the area of the surface of the elastic member at the first member side is larger than the area of the surface of the elastic member at the second member side, and thus, the force detector is hard to be crushed and has high reliability. Further, the area of the surface of the elastic member at the second member side is smaller than the area of the surface of the elastic member at the first member side, and thus, the applied external force may be concentrated on the pressure-sensitive devices, and thereby, detection sensitivity in detection of external force may be improved.

Further, the plurality of pressure-sensitive devices are provided for one elastic member, and thus, not only the pressure but also shearing force or the like, for example, may be detected.

In the force detector according to the aspect of the invention, it is preferable that three or more of the elastic members arranged around a set point set on the second member are provided, and, in the respective three or more elastic members, when straight lines passing through the set point and centers of the elastic members are assumed, two of the pressure-sensitive devices provided between the elastic member and the second member are placed at both sides of the straight line with the straight line in between.

With this configuration, moment around three axes orthogonal to one another and shearing forces along the two axes orthogonal to each other may be detected using the smaller number of pressure-sensitive devices.

In the force detector according to the aspect of the invention, it is preferable that four of the elastic members arranged around a set point set on the second member are provided, and, in the respective four elastic members, when straight lines passing through the set point and centers of the elastic members are assumed, two of the pressure-sensitive devices provided between the elastic member and the second member are placed at both sides of the straight line with the straight line in between.

With this configuration, moment around three axes orthogonal to one another and shearing forces along the two axes orthogonal to each other may be detected using the smaller number of pressure-sensitive devices.

In the force detector according to the aspect of the invention, it is preferable that the two pressure-sensitive devices are placed line-symmetrically with respect to the straight line.

With this configuration, moment around three axes orthogonal to one another and shearing forces along the two axes orthogonal to each other may be detected more easily using the smaller number of pressure-sensitive devices.

In the force detector according to the aspect of the invention, it is preferable that the three or more elastic members are arranged so that the distances between the centers of the elastic members and the set point may be equal and the angular intervals may be equal.

With this configuration, external forces may be detected without deflection.

In the force detector according to the aspect of the invention, it is preferable that the surface of the elastic member at the second member side includes the plurality of pressure-sensitive devices provided between the elastic member and the second member.

With this configuration, the applied external forces may be transmitted to the pressure-sensitive devices with higher accuracy.

In the force detector according to the aspect of the invention, it is preferable that the surface of the elastic member at the second member side has a circular shape.

With this configuration, dependence of an amount of deformation of the elastic member on the direction of the applied external force may be suppressed.

In the force detector according to the aspect of the invention, it is preferable that the surface of the elastic member at the first member side has a circular shape.

With this configuration, the dependence of the amount of deformation of the elastic member on the direction of the applied external force may be suppressed.

In the force detector according to the aspect of the invention, it is preferable that a ratio $S1/S2$ of the area $S1$ of the surface of the elastic member at the first member side to the area S2 of the surface of the elastic member at the second member side is from 1.1 to 9.

With this configuration, the force detector is harder to be crushed, and the applied external forces may be concentrated on the pressure-sensitive devices.

In the force detector according to the aspect of the invention, it is preferable that two of the pressure-sensitive devices are placed between the elastic member and the second member, and the two pressure-sensitive devices have semi-circular shapes and are arranged with a gap between linear parts connecting both ends of semi-circular arcs of the two pressure-sensitive devices.

With this configuration, when the surface of the elastic member at the second member side has the circular shape, the elastic member may be stably supported and the dependence of the amount of deformation of the elastic member on the direction of the applied external force may be suppressed.

In the force detector according to the aspect of the invention, it is preferable that the pressure-sensitive device includes a pair of electrodes placed with a gap between each other, and a layer having a parent material provided between the pair of electrodes and having elasticity and a plurality of fillers dispersed in the parent material and having conductivity.

With this configuration, external forces may be detected by a simple configuration.

In the force detector according to the aspect of the invention, it is preferable to include a substrate provided between the elastic member and the plurality of pressure-sensitive devices and having flexibility and an adhesive layer provided to surround the plurality of pressure-sensitive devices and bonding the substrate and the second member.

With this configuration, external forces may be detected by a simple configuration.

A robot according to an aspect of the invention includes at least one arm connector having a plurality of arms and rotatably connecting adjacent arms of the plurality of arms, an end effector provided at a distal end side of the arm connector, and a force detector provided between the arm connector and the end effector and detecting an external force applied to the end effector, the force detector includes a plate-like first member, a plate-like second member provided with a gap between the first member and itself, an elastic member provided between the first member and the second member, and a plurality of pressure-sensitive devices provided between the elastic member and the second member, wherein an area of a surface of the elastic member at the first member side is larger than an area of a surface of the elastic member at the second member side.

With this configuration, the same advantages as those of the force detector of the invention may be obtained. Further, the external forces detected by the force detector may be fed back and work may be executed more precisely. Furthermore, by the forces detected by the force detector, the end effector in contact with an obstacle or the like ma be sensed. Accordingly, the obstacle avoidance operation, the object damage avoidance operation, etc. that have been difficult by the position control in related art may be easily performed, and work may be executed more safely.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a force detector and a robot according to the invention will be explained in detail according to embodiments shown in the accompanying drawings.

First Embodiment

Figure 1:
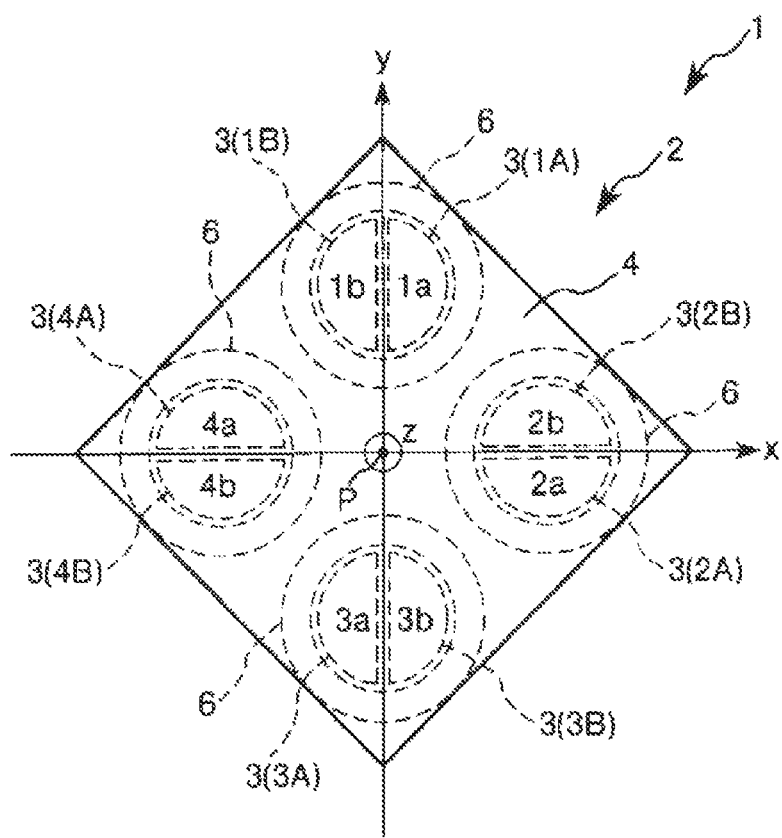
FIG. 1 is a plan view showing a force detector according to a first embodiment of the invention.
Figure 2:
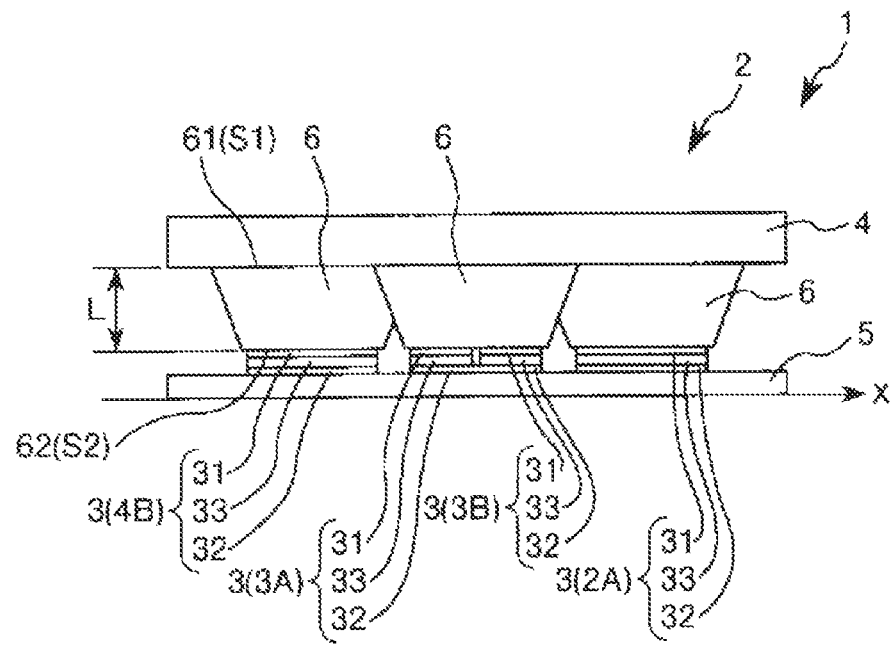
FIG. 2 is a side view of the force detector shown in FIG. 1.

FIG. 1 is a plan view showing a force detector according to the first embodiment of the invention. FIG. 2 is a side view of the force detector shown in FIG. 1. FIGS. 3A to 3D are side views showing other configuration examples of elastic members.

Note that, as below, for convenience of explanation, the upside in FIGS. 2 and 3 will be referred to as "upper" or "over" and the downside will be referred to as "lower" or "under". Further, in FIG. 1, three-dimensional coordinates having an x-axis, a y-axis, and a z-axis orthogonal to one another are assumed. Then, a set point P is set on the origin of the three-dimensional coordinates (on a second substrate 5). Furthermore, suppose that output values of respective pressure-sensitive devices 3, i.e., values of voltages (voltage values) output from the respective pressure-sensitive devices 3 are respectively 1a, 1b, 2a, 2b, 3a, 3b, 4a, 4b as shown in FIG. 1, the values are shown on the corresponding pressure-sensitive devices 3.

The force detector 1 shown in FIGS. 1 and 2 has a function of detecting an external force (including moment). The force detector 1 includes a detection unit 2 that outputs a signal in response to an applied external force and an external force detection circuit (not shown).

As shown in FIGS. 1 and 2, the detection unit 2 has a first substrate (first member) 4 and a second substrate (second member) 5 provided with a gap between each other, eight pressure-sensitive devices 3 that output signals in response to applied external forces, and four elastic members 6. Note that either of the first substrate 4 or the second substrate 5 may be used as a substrate to which a force is applied, and, in the embodiment, the explanation will be made with the first substrate 4 as the substrate to which a force is applied. Further, the respective number of pressure-sensitive devices 3 and number of elastic members 6 are not limited to those numbers, however, the number of pressure-sensitive devices 3 may be two, for example, and the number of elastic members 6 may be one, for example.

The respective shapes of the first substrate 4 and the second substrate 5 are not particularly limited, however, they are squares (rectangles) in the embodiment. The first substrate 4 and the second substrate 5 are placed at a predetermined distance. Note that the respective constituent materials of the first substrate 4 and the second substrate are not particularly limited, however, various resin materials or the like may be used, for example.

The respective pressure-sensitive devices 3 are provided between the first substrate 4 and the second substrate 5. The respective pressure-sensitive devices 3 are the same and one pressure-sensitive device 3 will be representatively explained as below. Note that, here, the structure of the pressure-sensitive device 3 is centered and the arrangement, the shape, and the like of the respective pressure-sensitive devices 3 will be described later.

The pressure-sensitive device 3 has a pair of electrodes 31, 32 placed with a gap between each other and a pressure-sensitive conductor layer 33 provided between the pair of electrodes 31, 32. The electrode 32 is a common electrode of the pair of pressure-sensitive devices 3 provided in correspondence with one elastic member 6 and placed at the second substrate 5 side (at the opposite side to the elastic member 6). Further, the electrode 31 is an individual electrode and placed at the first substrate 4 side (at the elastic member 6 side). Note that the electrode 31 may be a common electrode and the electrode 32 may be an individual electrode, or the respective electrodes 31, 32 may be individual electrodes.

The respective constituent materials of the electrodes 31, 32 are not particularly limited, however, include gold, titanium, aluminum, copper, iron, alloys containing them, and the like, for example.

The pressure-sensitive conductor layer 33 has a layered parent material having elasticity and a plurality of fillers dispersed in the parent material and having conductivity. The pressure-sensitive conductor layer 33 is deformed in response to an applied force and the amounts and the areas of the fillers in contact change, and thereby, a voltage (signal) in response to the applied force is output from the pressure-sensitive device 3.

The constituent material of the parent material of the pressure-sensitive conductor layer 33 is not particularly limited as long as it is an elastic material having insulation properties, and includes various rubber materials including natural rubber, isoprene rubber, butadiene rubber, styrene-butadiene rubber, nitrile rubber, chloroprene rubber, butyl rubber, acrylic rubber, ethylene-propylene rubber, epichlorohydrin rubber, urethane rubber, silicone rubber, and fluoro-rubber and various kinds of thermoplastic elastomer including styrene series, polyolefin series, polyvinyl chloride series, polyurethane series, polyester series, polyamide series, polybutadiene series, trans-polyisoprene series, fluoro-rubber series, and chlorinated polyethylene series, for example, and one or two kinds of them may be mixed for use.

Further, the constituent material of the filler of the pressure-sensitive conductor layer 33 is not particularly limited, however, includes gold, titanium, aluminum, copper, iron, alloys containing them, carbon, and the like, for example.

The respective elastic members 6 are provided between the first substrate 4 and the pairs of pressure-sensitive devices 3. That is, one elastic member 6 is provided for the pair of pressure-sensitive devices 3. An external force applied to the first substrate 4 is transmitted to the corresponding one pair of pressure-sensitive devices 3 via each elastic member 6. The respective elastic members 6 are the same and one elastic member 6 will be representatively explained as below.

The elastic member 6 has a part having an area in cross section that gradually decreases from the first substrate 4 side toward the second substrate 5 side, and an area S1 of a surface of the elastic member 6 at the first substrate 4 side, i.e., an upper surface 61 is larger than an area S2 of a surface at the second substrate 5 side, i.e., a lower surface 62. Specifically, the elastic member 6 has a truncated cone shape. That is, the upper surface 61 and the lower surface 62 of the elastic member 6 respectively have circular shapes, the center axis of the upper surface 61 and the center axis of the lower surface 62 are aligned, and the area in cross section of the elastic member 6 gradually decreases from the upper surface 61 to the lower surface 62.

The upper surface 61 and the lower surface 62 of the elastic member 6 respectively have the circular shapes, and thereby, dependence of the amount of deformation of the elastic member 6 on the direction of the external force applied to the first substrate 4 may be suppressed. That is, external forces in all directions applied to the first substrate 4 may be properly (uniformly) detected.

Further, the area of the surface of the elastic member 6 at the first substrate 4 side is larger than the area of the surface at the second substrate 5 side, and thus, in the first substrate 4 of the detection unit 2, the part without the elastic member 6 underneath is smaller, the detection unit 2 is hard to be crushed, and reliability becomes higher. Furthermore, the area of the surface of the elastic member 6 at the second substrate 5 side is smaller than the area of the surface at the first substrate 4 side and the external force applied to the first substrate 4 may be concentrated on the pressure-sensitive devices 3, and thereby, detection sensitivity in detection of external force may be improved.

In addition, the ratio S1/S2 of the area S1 of the upper surface 61 to the area S2 of the lower surface of the elastic member 6 is not particularly limited, but appropriately set according to various conditions, and preferably from 1.1 to 9 and more preferably from 2 to 4. Thereby, the detection unit 2 may be made harder to be crushed and the external force applied to the first substrate 4 may be concentrated on the pressure-sensitive devices 3.

Further, the area S1 of the upper surface 61 of the elastic member 6 is not particularly limited, but appropriately set according to various conditions, and preferably from 5 mm$^2$ to 500 mm$^2$ and more preferably from 10 mm$^2$ to 100 mm$^2$. Thereby, the detection unit 2 may be made harder to be crushed.

Furthermore, the area S2 of the lower surface 62 of the elastic member 6 is not particularly limited, but appropriately set according to various conditions, and preferably from 0.5 mm$^2$ to 300 mm$^2$ and more preferably from 3 mm$^2$ to 30 mm$^2$. Thereby, the external force applied to the first substrate 4 may be concentrated on the pressure-sensitive devices 3.

In addition, a length L of the elastic member 6 in the vertical direction (axial direction) in FIG. 1 is not particularly limited, but appropriately set according to various conditions, and preferably from 0.5 mm to 10 mm and more preferably from 1 mm to 5 mm. Thereby, the external force applied to the first substrate 4 may be concentrated on the pressure-sensitive devices 3.

The respective elastic members 6 are arranged around the set point P. In this case, the respective elastic members 6 are placed so that the distances between the centers of the elastic members 6 and the set point P may be equal and the angular intervals may be equal (at intervals of 90° in the illustrated configuration). That is, the respective elastic members 6 are arranged at equal angular intervals on one circle around the set point P. Further, the centers of two elastic members 6 are respectively located on the x-axis (straight line) and the centers of the other two elastic members 6 are respectively located on the y-axis (straight line). Thereby, external forces may be detected without deflection. Note that the x-axis is the straight line passing through the set point P and the centers of the two elastic members 6 and the y-axis is the straight line passing through the set point P and the centers of the other two elastic members 6.

Note that the constituent material of the elastic member 6 is not particularly limited as long as it is an elastic material, and includes various rubber materials including natural rubber, isoprene rubber, butadiene rubber, styrene-butadiene rubber, nitrile rubber, chloroprene rubber, butyl rubber, acrylic rubber, ethylene-propylene rubber, epichlorohydrin rubber, urethane rubber, silicone rubber, and fluoro-rubber and various kinds of thermoplastic elastomer including styrene series, polyolefin series, polyvinyl chloride series, polyurethane series, polyester series, polyamide series, polybutadiene series, trans-polyisoprene series, fluoro-rubber series, and chlorinated polyethylene series, for example, and one or two kinds of them may be mixed for use.

As below, when the respective pressure-sensitive devices 3 are not distinguished, they are referred to as "pressure-sensitive devices 3", and, when distinguished, they are referred to as "pressure-sensitive devices 1A, 1B, 2A, 2B, 3A, 3B, 4A, 4B".

The pressure-sensitive devices 1B, 1A, 2B, 2A, 3B, 3A, 4B, 4A are arranged clockwise in FIG. 1 in this order. Further, the pair of pressure-sensitive devices 1A, 1B are placed under the common elastic member 6. Similarly, the pair of pressure-sensitive devices 2A, 2B are placed under the common elastic member 6. Similarly, the pair of pressure-sensitive devices 3A, 3B are placed under the common elastic member 6. Similarly, the pair of pressure-sensitive devices 4A, 4B are placed under the common elastic member 6.

As described above, the pair of pressure-sensitive devices 1A, 1B and the elastic member 6 placed over them, the pair of pressure-sensitive devices 2A, 2B and the elastic member 6 placed over them, the pair of pressure-sensitive devices 3A, 3B and the elastic member 6 placed over them, and the pair of pressure-sensitive devices 4A, 4B and the elastic member 6 placed over them are the same, and the pair of pressure-sensitive devices 1A, 1B and the elastic member 6 placed over them will be representatively explained as below.

First, the pressure-sensitive devices 1B, 1A respectively have semi-circular shapes. Further, the pressure-sensitive device 1A and the pressure-sensitive device 1B are placed apart from each other at both sides of the y-axis with the y-axis in between. Furthermore, the pressure-sensitive device 1A and the pressure-sensitive device 1B are placed line-symmetrically with respect to the y-axis. The pressure-sensitive device 1A and the pressure-sensitive device 1B are arranged with a gap between a linear part connecting both ends of the semi-circular arc of the pressure-sensitive device 1A and a linear part connecting both ends of the semi-circular arc of the pressure-sensitive device 1B. Note that the semi-circular shape includes not only a complete semi-circle but also a semi-circle without a portion or the like.

Thereby, the elastic member 6 may be stably supported and the dependence of the amount of deformation of the elastic member 6 on the direction of the external force applied to the first substrate 4 may be suppressed. That is, external forces in all directions applied to the first substrate 4 may be properly (uniformly) detected.

Note that the pressure-sensitive device 3A and the pressure-sensitive device 3B are placed line-symmetrically with respect to the y-axis, the pressure-sensitive device 2A and the pressure-sensitive device 2B are placed line-symmetrically with respect to the x-axis, and the pressure-sensitive device 4A and the pressure-sensitive device 4B are placed line-symmetrically with respect to the x-axis.

Here, the surface of the elastic member 6 at the second substrate 5 side, i.e., the lower surface 62 includes the pressure-sensitive devices 1A, 1B. In this case, the circle of the lower surface 62 is slightly larger than the circle formed by the pressure-sensitive devices 1A, 1B. Thereby, the external force applied to the upper surface 61 of the elastic member 6 may be transmitted to the pressure-sensitive devices 1A, 1B.

Note that, obviously, the lower surface 62 of the elastic member 6 does not necessarily include the pressure-sensitive devices 1A, 1B, and the upper surface 61 and the lower surface 62 of the elastic member 6 do not necessarily have the circular shapes. The other shapes of the upper surface 61 and the lower surface of the elastic member include polygonal shapes including triangular shapes, rectangular shapes, and pentagonal shapes, elliptical shapes, semi-elliptical shapes, semi-circular shapes, etc., for example.

Further, the respective shapes of the pressure-sensitive devices 1A, 1B are not particularly limited to the semi-circular shapes, and include polygonal shapes including triangular shapes, rectangular shapes, and pentagonal shapes, elliptical shapes, semi-elliptical shapes, circular shapes, etc., for example.

Note that the bonding method of the respective parts of the detection unit 2 is not particularly limited, but include bonding using an adhesive or the like, for example.

Here, the shape of the elastic member 6 is not limited to those described above, but may be any shape as long as the area of the upper surface 61 may be larger than the area of the lower surface 62. As below, the other configuration examples of the elastic member 6 will be explained with reference to FIGS. 3A to 3D.

Figure 3A:
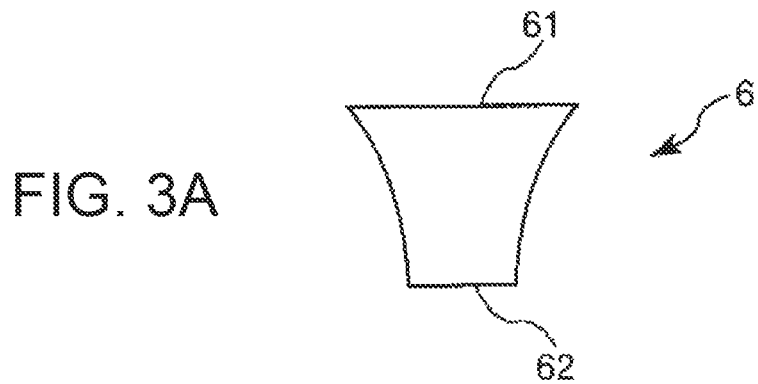
FIGS. 3A to 3D are side views showing other configuration examples of elastic members.
Figure 3B:
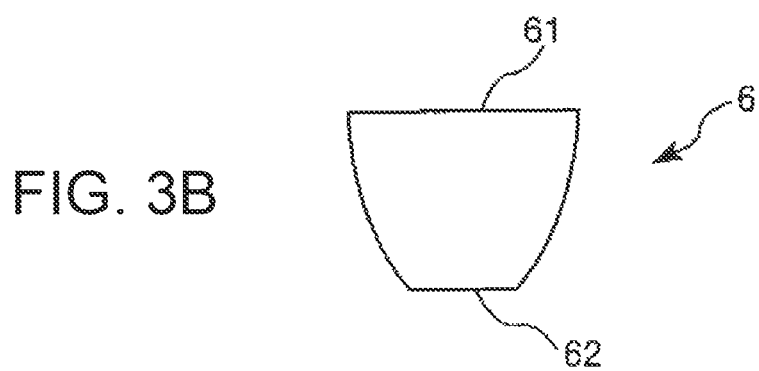
Figure 3C:
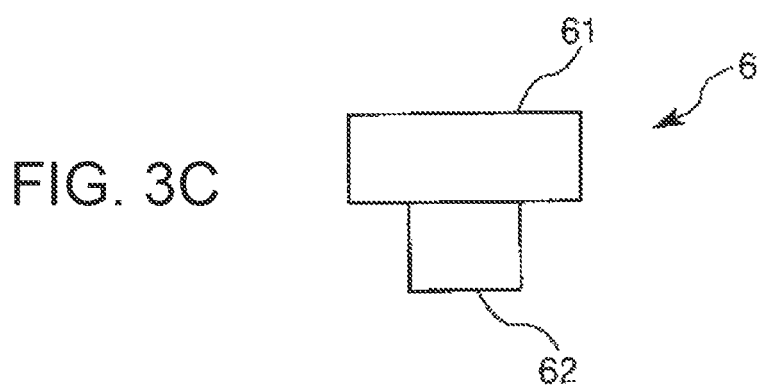
Figure 3D:
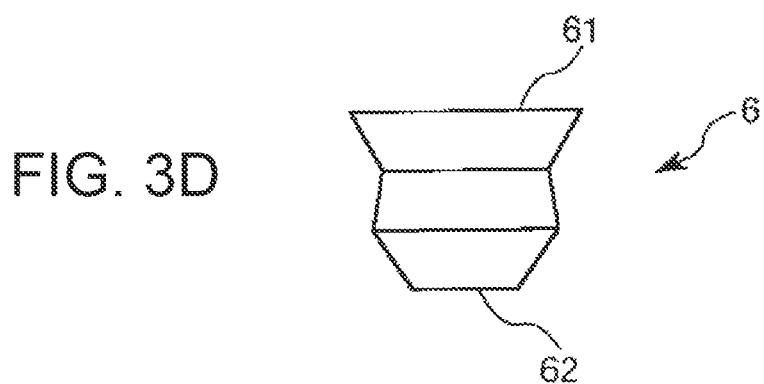

The elastic member 6 shown in FIG. 3A has a side surface of a curved concave surface. Further, the elastic member 6 shown in FIG. 3B has a side surface of a curved convex surface. The elastic member 6 shown in FIG. 3C has a side surface with a step. Furthermore, the elastic member 6 shown in FIG. 3D has a part in which the area in cross section gradually increases from the first substrate 4 side toward the second substrate 5 side in the middle in the vertical direction of the drawing in addition to the part in which the area in cross section gradually decreases from the first substrate 4 side toward the second substrate 5 side.

Next, the external force detection circuit (not shown) of the force detector 1 will be explained.

The signal (voltage) detected in the detection unit 2 is input to the external force detection circuit (not shown).

The external force detection circuit has a function of calculating and outputting in the following manner using the input signal. That is, the external force detection circuit obtains and outputs pressure Fa applied to the whole surface of the first substrate 4, shearing force Fx along the x-axis, shearing force Fy along the y-axis, moment Mx around the x-axis, moment My around the y-axis, and moment Mz around the z-axis in the following manner.

Note that, for example, when a shearing force is applied in the positive direction along the x-axis, the elastic member 6 on the pressure-sensitive devices 1A, 1B is deformed to fall toward the positive direction along the x-axis. Thereby, the part of the elastic member 6 at the pressure-sensitive device 1A side is compressed and contracts and the part at the pressure-sensitive device 1B side relatively expands. Accordingly, the shearing force Fx along the x-axis is proportional to the difference between the voltage value $1a$ and the voltage value $1b$. The shearing force is calculated using the principle.

Further, for example, when the moment Mx around the x-axis is applied, one of the elastic members 6 on the pressure-sensitive devices 1A, 3A is compressed and contracts and the other relatively expands. Accordingly, the moment Mx along the x-axis is proportional to the difference between the voltage value $1a$ and the voltage value $3a$. The moment is calculated using the principle.

First, the pressure Fa applied to the whole surface of the first substrate 4 is obtained as follows.

$$Fa=(1a+1b)+(2a+2b)+(3a+3b)+(4a+4b)$$

Further, the shearing force Fx along the x-axis is obtained as follows.

$$Fx \propto (1a-1b)+(3b-3a)$$

Furthermore, the shearing force Fy along the y-axis is obtained as follows.

$$Fy \propto (4a-4b)+(2b-2a)$$

The moment Mx around the x-axis is obtained as follows.

$$Mx \propto (3a+3b)-(1a+1b)$$

The moment My around the y-axis is obtained as follows.

$$My \propto (2a+2b)-(4a+4b)$$

The moment Mz around the z-axis is obtained as follows.

$$Mz \propto (1a-1b)+(2a-2b)+(3a-3b)+(4a-4b)$$

As explained above, according to the force detector 1, the area of the upper surface 61 of the elastic member 6 is larger than the area of the lower surface 62, and thus, the force detector is harder to be crushed and has higher reliability.

Further, the area of the lower surface 62 of the elastic member 6 is smaller than the area of the upper surface 61, and thus, the applied external forces may be concentrated on the pressure-sensitive devices 3 and the external forces may be detected thereby.

Furthermore, the pair of pressure-sensitive devices 3 are provided for one elastic member 6, and the shearing force may be detected.

In addition, four sets of the pairs of pressure-sensitive devices 3 are provided, and the moment around the x-axis, the moment around the y-axis, and the moment around the z-axis may be detected. Moreover, regarding the shearing force, the shearing force along the x-axis and the shearing force along the y-axis may be detected.

As described above, in the force detector 1, the respective external forces may be detected using the smaller number of pressure-sensitive devices 3, and the detection sensitivity may be improved.

Second Embodiment

Figure 4:
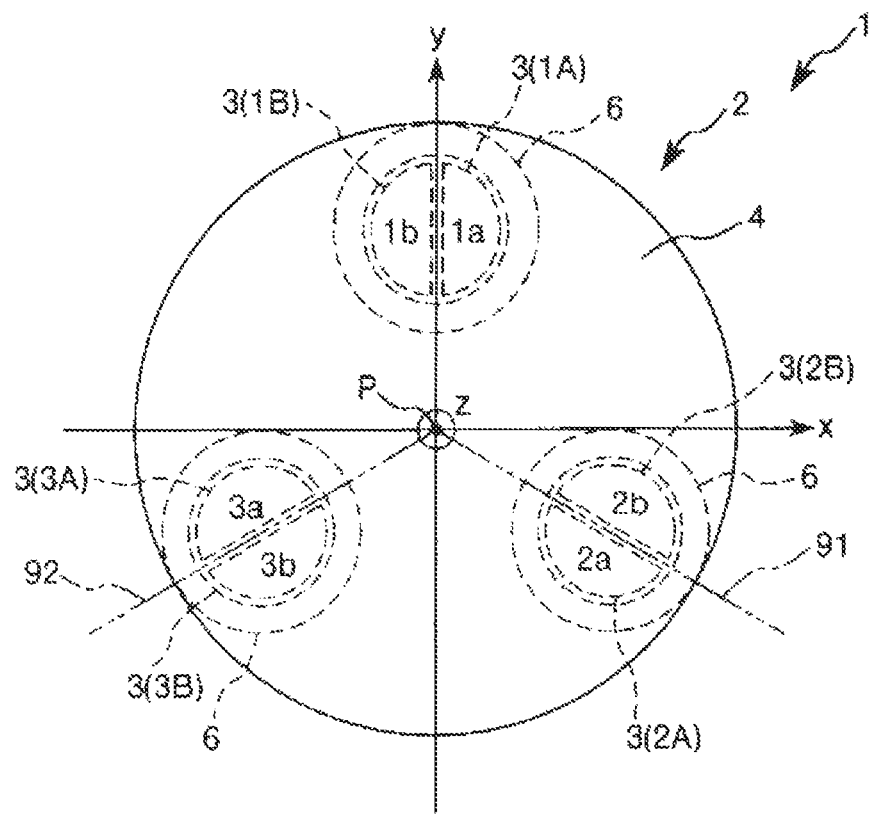
FIG. 4 is a plan view showing a force detector according to a second embodiment of the invention.
Figure 5:
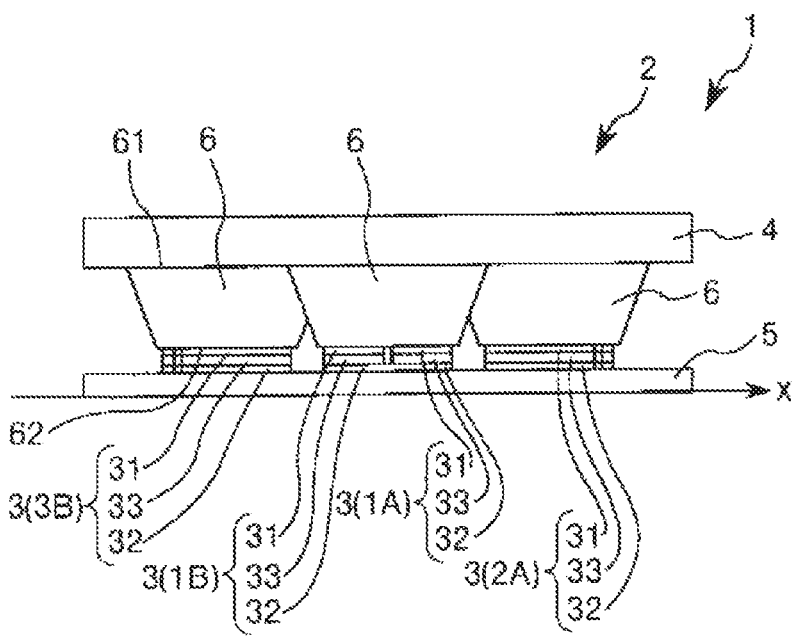
FIG. 5 is a side view of the force detector shown in FIG. 4.

FIG. 4 is a plan view showing a force detector according to the second embodiment of the invention. FIG. 5 is a side view of the force detector shown in FIG. 4.

Note that, as below, for convenience of explanation, the upside in FIG. 5 will be referred to as "upper" or "over" and the downside will be referred to as "lower" or "under". Further, in FIG. 4, three-dimensional coordinates having an x-axis, a y-axis, and a z-axis orthogonal to one another are assumed, and the origin of the three-dimensional coordinates is set as a set point P. Furthermore, suppose that output values of respective pressure-sensitive devices 3, i.e., values of voltages (voltage values) output from the respective pressure-sensitive devices 3 are respectively $1a$, $1b$, $2a$, $2b$, $3a$, $3b$ as shown in FIG. 1, the values are shown on the corresponding pressure-sensitive devices 3. In addition, when the respective pressure-sensitive devices 3 are not distinguished, they are referred to as "pressure-sensitive devices 3", and, when distinguished, they are referred to as "pressure-sensitive devices 1A, 1B, 2A, 2B, 3A, 3B".

As below, the second embodiment will be explained with a focus on the differences from the above described first embodiment, and the explanation of the same items will be omitted.

As shown in FIGS. 4 and 5, in the force detector 1 of the second embodiment, the respective shapes of the first substrate 4 and the second substrate 5 are circular shapes.

Further, the number of elastic members 6 is three and the number of pressure-sensitive devices 3 is six. That is, the detection unit 2 of the force detector 1 have three sets of pairs of pressure-sensitive devices 3.

The respective elastic members 6 are arranged around the set point P. In this case, the respective elastic members 6 are placed so that the distances between the centers of the elastic members 6 and the set point P may be equal and the angular intervals may be equal (at intervals of 120° in the illustrated configuration). That is, the respective elastic members 6 are arranged at equal angular intervals on one circle around the set point P. Further, the center of the first elastic member 6 is located on the y-axis, the center of the second elastic member 6 is located on a straight line 91 in a position rotated from the y-axis clockwise by 120° on the x-y plane, and the center of the third elastic member 6 is located on a straight line 92 in a position rotated from the y-axis clockwise by 240° on the x-y plane. Thereby, external forces may be detected without deflection.

Further, the pressure-sensitive device 1A and the pressure-sensitive device 1B are placed line-symmetrically with respect to the y-axis, the pressure-sensitive device 2A and the pressure-sensitive device 2B are placed line-symmetrically with respect to the straight line 91, and the pressure-sensitive device 3A and the pressure-sensitive device 3B are placed line-symmetrically with respect to the straight line 92.

Furthermore, the external force detection circuit (not shown) of the force detector 1 has a function of calculating and outputting in the following manner using an input signal (voltage). That is, the external force detection circuit obtains and outputs pressure Fa applied to the whole surface of the first substrate 4, shearing force Fx along the x-axis, shearing force Fy along the y-axis, moment Mx around the x-axis, moment My around the y-axis, and moment Mz around the z-axis in the following manner.

First, the pressure Fa applied to the whole surface of the first substrate 4 is obtained as follows.

$$Fa=(1a+1b)+(2a+2b)+(3a+3b)$$

Further, the shearing force Fx along the x-axis is obtained as follows.

$$Fx \propto (1a-1b)$$

Furthermore, the shearing force Fy along the y-axis is obtained as follows.

$$Fy \propto (2b-2a)+(3a-3b)$$

The moment Mx around the x-axis is obtained as follows.

$$Mx \propto [(2a+2b)+(3a+3b)]-2 \cdot (1a-1b)$$

The moment My around the y-axis is obtained as follows.

$$My \propto (2a+2b)-(3a+3b)$$

The moment Mz around the z-axis is obtained as follows.

$$Mz \propto (1a-1b)+(2a-2b)+(3a-3b)$$

According to the force detector 1, the same advantages as those of the above described first embodiment may be obtained.

Further, in the force detector 1, detection may be performed with the smaller number of pressure-sensitive devices 3 than that of the first embodiment.

Third Embodiment 3

Figure 6:
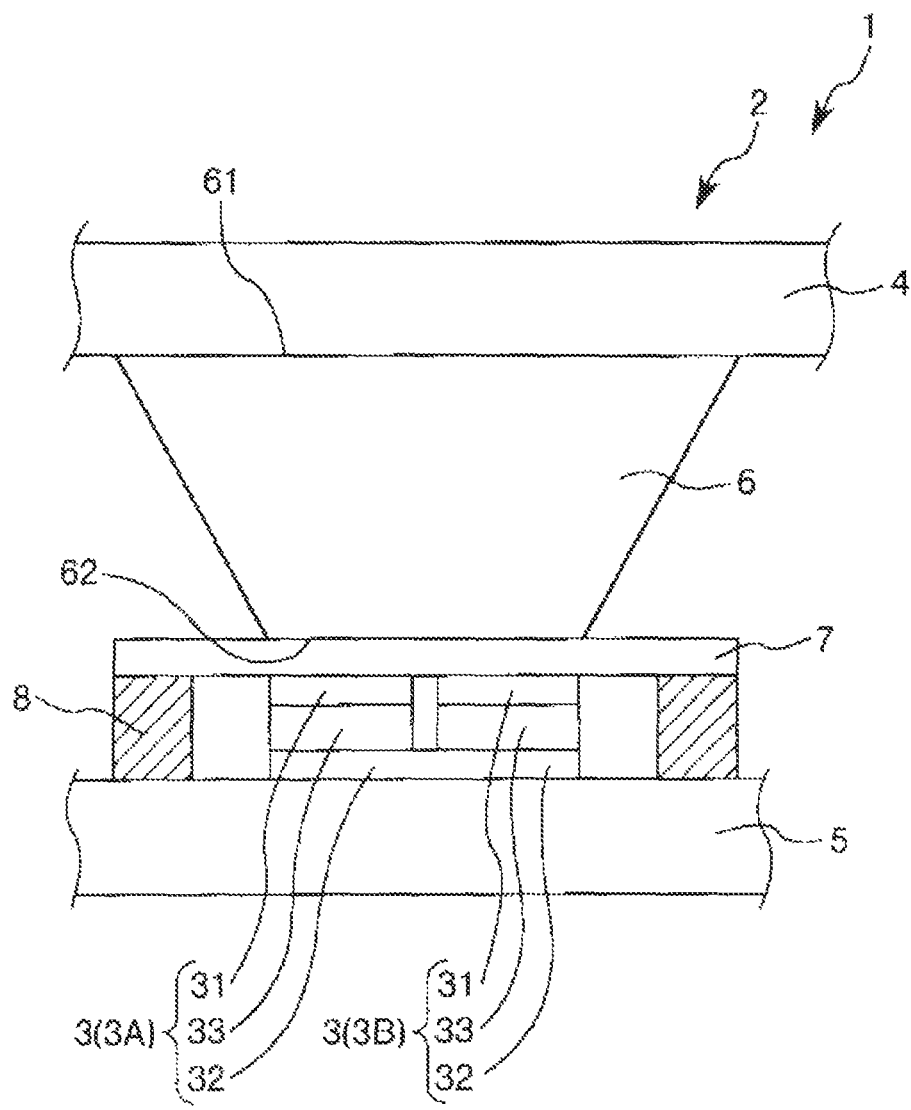
FIG. 6 is a side view (partial sectional view) showing a force detector according to a third embodiment of the invention.

FIG. 6 is a side view (partial sectional view) showing a force detector according to the third embodiment of the invention. Note that, as below, for convenience of explanation, the upside in FIG. 6 will be referred to as "upper" or "over" and the downside will be referred to as "lower" or "under".

As below, the third embodiment will be explained with a focus on the differences from the above described first embodiment, and the explanation of the same items will be omitted.

As shown in FIG. 6, the detection unit 2 of the force detector 1 of the third embodiment further has a substrate 7 provided between the elastic member 6 and the pressure-sensitive devices 3 and having flexibility and an adhesive layer 8 having elasticity or flexibility in addition to the first substrate 4, the second substrate 5, the pressure-sensitive devices 3, and the elastic member 6.

Further, the substrate 7 and the second substrate 5 are bonded (secured) by the adhesive layer 8. The adhesive layer 8 is formed around the pair of pressure-sensitive devices 3 to surround the pair of pressure-sensitive devices 3 over the entire circumference. Note that the substrate 7 has flexibility and the adhesive layer 8 has elasticity or flexibility, and thus, the external force applied to the first substrate 4 is transmitted to the pair of pressure-sensitive devices 3 via the elastic member 6 and the substrate 7.

According to the force detector 1, the same advantages as those of the above described first embodiment may be obtained.

The third embodiment may be applied to the second embodiment.

Embodiment of Single-Arm Robot

Next, a single-arm robot as an embodiment of a robot of the invention will be explained with reference to FIG. 7. As below, the embodiment will be explained with a focus on the differences from the above described first, second, and third embodiments, and the explanation of the same items will be omitted.

Figure 7:
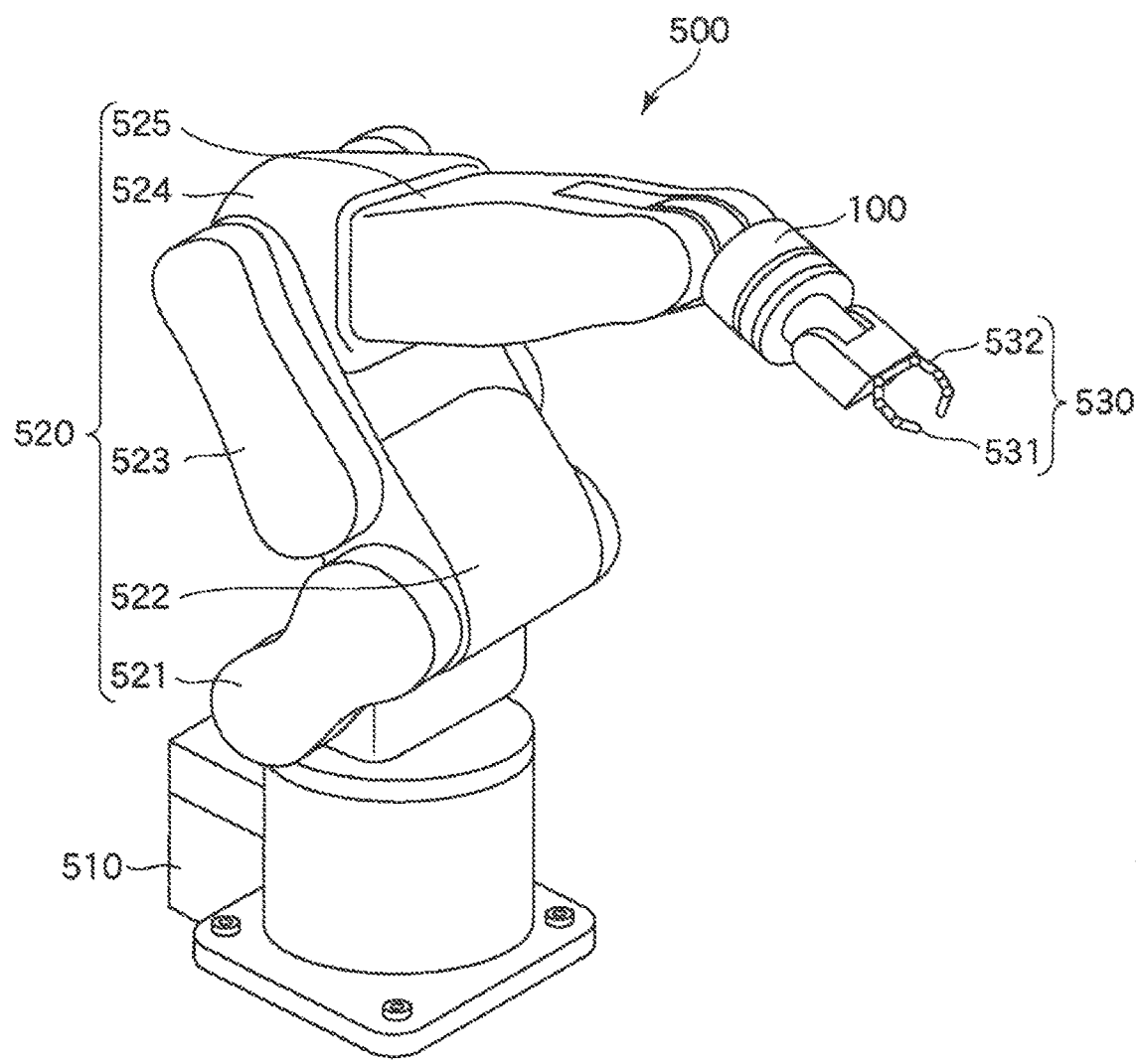
FIG. 7 shows an example of a single-arm robot using the force detector according to an embodiment of the invention.

FIG. 7 shows an example of the single-arm robot using the force detector according to the invention. A single-arm robot 500 in FIG. 7 has a base 510, an arm connector 520, an end effector 530 provided at the distal end side of the arm connector 520, and a force detector 100 provided between the arm connector 520 and the end effector 530. Note that, as the force detector 100, the same one as those in the respective embodiments is used.

The base 510 has a function of housing an actuator (not shown) that generates power for rotating the arm connector 520, a control unit (not shown) that controls the actuator, etc. Further, the base 510 is fixed to a floor, a wall, a ceiling, a movable carriage, or the like, for example.

The arm connector 520 has a first arm 521, a second arm 522, a third arm 523, a fourth arm 524, and a fifth arm 525, and is adapted to rotatably connect the adjacent arms. The arm connector 520 is driven by composite rotation or bending around the connecting parts of the respective arms under the control of the control unit.

The end effector 530 has a function of grasping an object. The end effector 530 has a first finger 531 and a second finger 532. The end effector 530 reaches a predetermined operation position by the driving of the arm connector 520, then, the separated distance between the first finger 531 and the second finger 532 is adjusted, and thereby, the object may be grasped.

The force detector 100 has a function of detecting an external force applied to the end effector 530. The force detected by the force detector 100 is fed back to the control unit of the base 510, and thereby, the single-arm robot 500 may execute more precise work. Further, by the force detected by the force detector 100, the single-arm robot 500 may sense the end effector 530 in contact with an obstacle or the like. Accordingly, the obstacle avoidance operation, the object damage avoidance operation, etc. that have been difficult by the position control in related art may be easily performed, and the single-arm robot 500 may execute work more safely.

Note that, in the illustrated configuration, the arm connector 520 has the five arms in total, however, the invention is not limited to that. The cases where the arm connector 520 has a single arm, has two to four arms, and six or more arms fall within the scope of the invention.

Embodiment of Multi-Arm Robot

Next, a multi-arm robot as an embodiment of the robot according to the invention will be explained with reference to FIG. 8. As below, the embodiment will be explained with a focus on the differences from the above described first, second, and third embodiments, and the explanation of the same items will be omitted.

Figure 8:
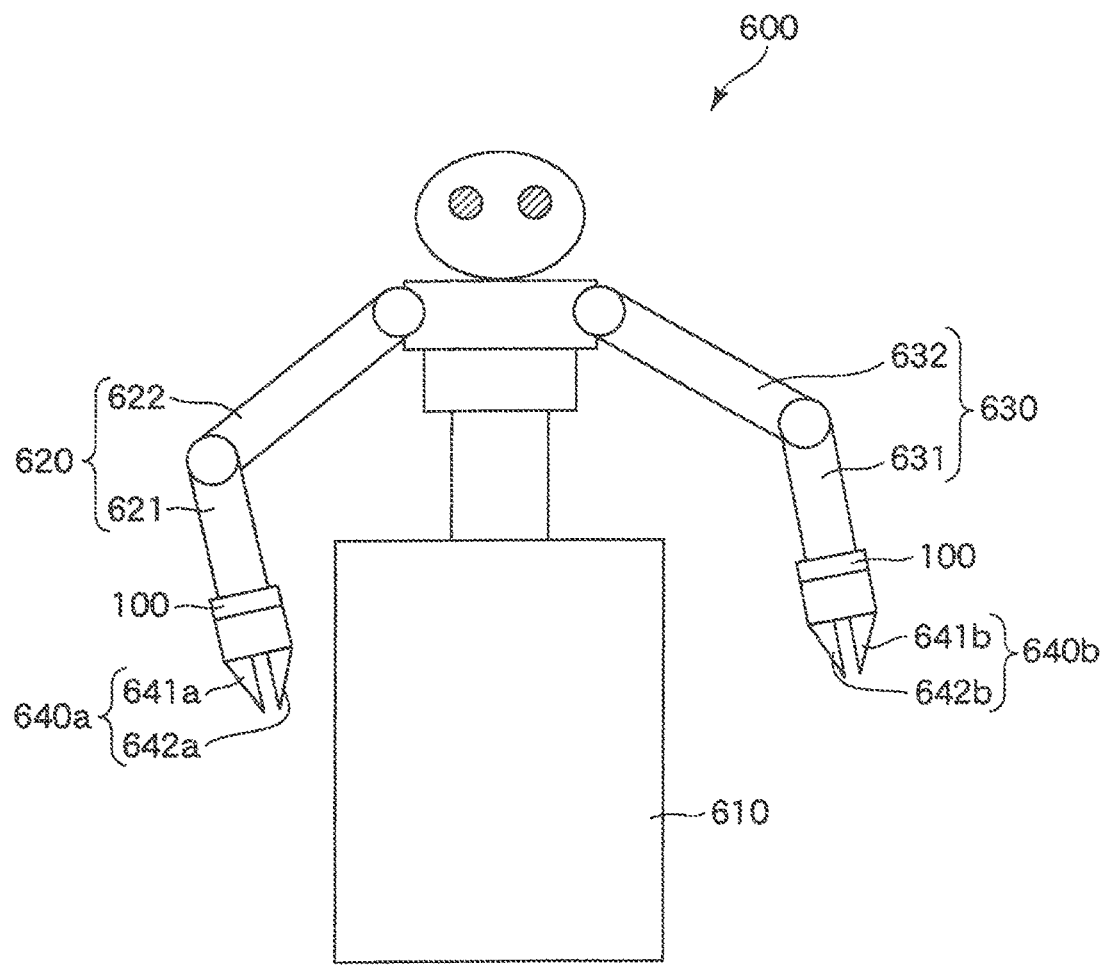
FIG. 8 shows an example of a multi-arm robot using the force detector according to an embodiment of the invention.

FIG. 8 shows an example of the multi-arm robot using the force detector according to the invention. A multi-arm robot 600 in FIG. 8 has a base 610, a first arm connector 620, a second arm connector 630, an end effector 640a provided at the distal end side of the first arm connector 620, an end effector 640b provided at the distal end side of the second arm connector 630, and force detectors 100 provided between the first arm connector 620 and the end effector 640a and between the second arm connector 630 and the end effector 640b. Note that, as the force detectors 100, the same ones as those in the respective embodiments are used.

The base 610 has a function of housing actuators (not shown) that generates power for rotating the first arm connector 620 and the second arm connector 630, a control unit (not shown) that controls the actuators, etc. Further, the base 610 is fixed to a floor, a wall, a ceiling, a movable carriage, or the like, for example.

The first arm connector 620 is adapted to rotatably connect a first arm 621 and a second arm 622. The second arm connector 630 is adapted to rotatably connect a first arm 631 and a second arm 632. The first arm connector 620 and the second arm connector 630 are driven by composite rotation or bending around the connecting parts of the respective arms under the control of the control unit.

The end effectors 640a, 640b have functions of grasping objects. The end effector 640a has a first finger 641a and a second finger 642a. The end effector 640b has a first finger 641b and a second finger 642b. The end effector 640a reaches a predetermined operation position by the driving of the first arm connector 620, then, the separated distance between the first finger 641a and the second finger 642a is adjusted, and thereby, the object may be grasped. Similarly, the end effector 640b reaches a predetermined operation position by the driving of the second arm connector 630, then, the separated distance between the first finger 641b and the second finger 642b is adjusted, and thereby, the object may be grasped.

The force detector 100 has a function of detecting external forces applied to the end effectors 640a, 640b. The forces detected by the force detector 100 is fed back to the control unit of the base 610, and thereby, the multi-arm robot 600 may execute more precise work. Further, by the forces detected by the force detector 100, the multi-arm robot 600 may sense the end effectors 640a, 640b in contact with an obstacle or the like. Accordingly, the obstacle avoidance operation, the object damage avoidance operation, etc. that have been difficult by the position control in related art may be easily performed, and the multi-arm robot 600 may execute work more safely.

Note that, in the illustrated configuration, the two arm connectors are provided in total, however, the invention is not limited to that. The case where the multi-arm robot 600 has three or more arm connectors falls within the scope of the invention.

The force detectors and the robots according to the invention have been explained according to the illustrated embodiments, however, the invention is not limited to those and the configurations of the respective parts may be replaced by any configurations having the same functions. Further, any other configurations may be added to the invention.

Furthermore, the invention may be a combination of any two or more configurations (features) of the above described embodiments.

In addition, in the above described embodiments, pressure-sensitive conductors are used as the pressure-sensitive devices, however, in the invention, not limited to those as long as their output changes in response to the applied external force. For example, piezoelectric materials or the like may be employed.

Further, in the robot according to the invention, the force detector is provided between the arm connector and the end effector, however, in the invention, not limited to that. For example, the detection unit of the force detector may be provided on a finger tip of the end effector or the like and the force detector may be used as a tactile sensor.

Furthermore, the robot according to the invention is not limited to the armed robot (robot arm), but may be another type of robot including a scalar robot, a legged walking (running) robot, or the like, for example.

In addition, the force detector according to the invention may be applied, not limited to the robot, but to other devices including a carrier device such as an electronic component carrier device, a testing device such as an electronic component testing device, a machining device such as a cutting (grinding) device, a mobile device such as an automobile, a measurement device such as a vibration meter, an acceleration meter, a gravity meter, a dynamometer, a seismometer, or an inclinometer, an input device, or the like.

The entire disclosure of Japanese Patent Application No. 2013-035503 filed Feb. 26, 2013 is expressly incorporated by reference herein.

What is claimed is:

1. A force detector comprising:
a plate-like first member;
a plate-like second member provided with a gap between the first member and the second member;
an elastic member that has first and second surfaces opposite to each other and that is provided between the first member and the second member, the first and second surfaces respectively face the first and second members; and
a plurality of pressure-sensitive devices provided between the elastic member and the second member, wherein
an area S1 of the first surface is larger than an area S2 of the second surface,
each of the plurality of pressure-sensitive devices includes:
divided two electrodes provided next to each other with a first gap in a plan view;
a pressure-sensitive conductor layer is divided into two pieces with a second gap in the plan view, the two pieces respectively correspond to the divided two electrodes; and
a single common electrode, wherein
the divided two electrodes, the pressure-sensitive conductor layer and the single common electrode are directly stacked between the elastic member and the second member so that the second surface of the elastic member directly contacts the divided two electrodes and the single common electrode directly contacts the second member,
the plurality of pressure-sensitive devices are evenly located in point symmetry with respect to a center of the first member, and
the second gap is located on an imaginary radial linear line extending from the center of the first member in the plan view.

2. The force detector according to claim 1, wherein the elastic member is provided at each of the plurality of pressure-sensitive devices so that there are a plurality of elastic members.

3. The force detector according to claim 2, wherein a number of the plurality of elastic members is four.

4. The force detector according to claim 2, wherein
the two pieces of each of the plurality of pressure-sensitive devices have semi-circular shapes and are arranged with the second gap between linear parts connecting both ends of semi-circular arcs of the two pieces.

5. The force detector according to claim 1, wherein the second surface of the elastic member has a circular shape.

6. The force detector according to claim 1, wherein the first surface of the elastic member has a circular shape.

7. The force detector according to claim 1, wherein a ratio S1/S2 of the area S1 of the first surface of the elastic member to the area S2 of the second surface of the elastic member is from 1.1 to 9.

8. The force detector according to claim 1, wherein
the two pieces of each of the plurality of pressure-sensitive devices have semi-circular shapes and are arranged with the second gap between linear parts connecting both ends of semi-circular arcs of the two pieces.

9. The force detector according to claim 1, wherein the pressure-sensitive conductive layer is made of a material in which a plurality of conductive fillers are dispersed.

10. A robot comprising:
at least one arm connector having a plurality of arms and rotatably connecting adjacent arms of the plurality of arms;
an end effector provided at a distal end side of the arm connector; and
a force detector provided between the arm connector and the end effector and detecting an external force applied to the end effector,
the force detector including
a plate-like first member,
a plate-like second member provided with a gap between the first member and the second member,
an elastic member that has first and second surfaces opposite to each other and that is provided between the first member and the second member, the first and second surfaces respectively face the first and second members, and
a plurality of pressure-sensitive devices provided between the elastic member and the second member, wherein
an area of the first surface is larger than an area of the second surface,
each of the plurality of pressure-sensitive devices includes:
divided two electrodes provided next to each other with a first gap in a plan view;

a pressure-sensitive conductor layer is divided into two pieces with a second gap in the plan view, the two pieces respectively correspond to the divided two electrodes; and a single common electrode, wherein the divided two electrodes, the pressure-sensitive conductor layer and the single common electrode are directly stacked between the elastic member and the second member so that the second surface of the elastic member directly contacts the divided two electrodes and the single common electrode directly contacts the second member, the plurality of pressure-sensitive devices are evenly located in point symmetry with respect to a center of the first member, and the second gap is located on an imaginary radial linear line extending from the center of the first member in the plan view.

11. A robot comprising:

at least one arm connector having a plurality of arms and rotatably connecting adjacent arms of the plurality of arms;

an end effector provided at a distal end side of the arm connector; and a force detector provided between the arm connector and the end effector and detecting an external force applied to the end effector, wherein the force detector including three or more of elastic members that are evenly located in point symmetry with respect to a center of a plate-like member, and two pressure-sensitive devices that are provided spaced apart from each other with a first gap in a plan view, the two pressure-sensitive devices provided at each of the elastic members, the two pressure-sensitive devices provided between the each of the elastic members and the plate-like member, the first gap is located on an imaginary radial linear line extending from the center of the plate-like member in the plan view, and the two pressure-sensitive devices includes:

divided two electrodes provided next to each other with a second gap in the plan view;

a pressure-sensitive conductor layer; and a single common electrode, wherein the divided two electrodes, the pressure-sensitive conductor layer and the single common electrode are directly stacked between the elastic member and the plate-like member so that the elastic member directly contacts the divided two electrodes and the single common electrode directly contacts the plate-like member.

* * * * *